US010626918B2

(12) United States Patent
Yamamoto et al.

(10) Patent No.: US 10,626,918 B2
(45) Date of Patent: Apr. 21, 2020

(54) DOUBLE-ROW SELF-ALIGNING ROLLER BEARING

(71) Applicant: NTN CORPORATION, Osaka (JP)

(72) Inventors: Takashi Yamamoto, Kuwana (JP); Kazumasa Seko, Kuwana (JP); Yasuyuki Inoue, Kuwana (JP); Michio Hori, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/138,504

(22) Filed: Sep. 21, 2018

(65) Prior Publication Data

US 2019/0024712 A1 Jan. 24, 2019

Related U.S. Application Data

(63) Continuation of application No. PCT/JP2017/011775, filed on Mar. 23, 2017.

(30) Foreign Application Priority Data

Mar. 24, 2016 (JP) .................. 2016-059473
Mar. 24, 2016 (JP) .................. 2016-059474
(Continued)

(51) Int. Cl.
*F16C 23/08* (2006.01)
*F16C 19/38* (2006.01)
(Continued)

(52) U.S. Cl.
CPC .............. *F16C 23/08* (2013.01); *F16C 19/38* (2013.01); *F16C 19/386* (2013.01);
(Continued)

(58) Field of Classification Search
CPC ........ F16C 19/225; F16C 19/28; F16C 19/38; F16C 23/08; F16C 23/086; F16C 23/088;
(Continued)

(56) References Cited

U.S. PATENT DOCUMENTS 4,557,613 A * 12/1985 Tallian .................. F16C 23/086
384/568
5,433,535 A * 7/1995 Hah ........................ F16C 19/28
384/564
(Continued)

FOREIGN PATENT DOCUMENTS

CN 104956102 9/2015
DE 10 2004 047 881 A1 4/2006
(Continued)

OTHER PUBLICATIONS

International Search Report dated Jun. 27, 2017 in corresponding International Patent Application No. PCT/JP2017/011775.
(Continued)

*Primary Examiner* — James Pilkington

(57) ABSTRACT

A double-row self-aligning roller bearing, which is suitable for receiving an axial load and a radial load, and loads having different magnitudes acting on rollers in two rows, and achieves sufficient load capacity for the rollers that receive axial load within the constraint of dimensional standards, is provided. The double-row self-aligning roller bearing includes inner and outer rings; and rollers in two rows arranged in a bearing width direction interposed between the inner and outer rings and having lengths different from each other. The roller has an outer peripheral surface of a cross-sectional shape along a raceway surface of the outer ring having a spherical shape. Length of the longer rollers is equal to or greater than 39% of the bearing width.

(Continued)

A ratio of contact angle of the shorter rollers and contact angle of the longer rollers is within a range of 1:4 to 1:2.

17 Claims, 11 Drawing Sheets

(30) Foreign Application Priority Data

Mar. 10, 2017 (JP) ................................ 2014-045679
Mar. 14, 2017 (JP) ................................ 2017-048527

(51) Int. Cl.
| | |
|---|---|
| *F16C 43/06* | (2006.01) |
| *F16C 33/36* | (2006.01) |
| *F16C 33/58* | (2006.01) |
| *F16C 33/49* | (2006.01) |
| *F16C 19/22* | (2006.01) |
| *F16C 19/28* | (2006.01) |

(52) U.S. Cl.
CPC .......... *F16C 23/086* (2013.01); *F16C 23/088* (2013.01); *F16C 33/36* (2013.01); *F16C 33/585* (2013.01); *F16C 43/06* (2013.01); *F16C 19/225* (2013.01); *F16C 19/28* (2013.01); *F16C 33/49* (2013.01); *F16C 2206/04* (2013.01); *F16C 2240/34* (2013.01); *F16C 2240/40* (2013.01); *F16C 2360/31* (2013.01)

(58) Field of Classification Search
CPC ........ F16C 33/36; F16C 33/363; F16C 33/49; F16C 33/585; F16C 43/06; F16C 2206/04; F16C 2240/34; F16C 2240/40; F16C 2360/31
See application file for complete search history.

(56) References Cited

U.S. PATENT DOCUMENTS

| | | |
|---|---|---|
| 7,918,649 B2 | 4/2011 | Nakagawa et al. |
| 10,302,131 B2 | 5/2019 | Koganei et al. |
| 2007/0127858 A1 | 6/2007 | Nakagawa et al. |
| 2007/0297706 A1 | 12/2007 | Mori |
| 2013/0343689 A1* | 12/2013 | Kobayashi ............. F16C 19/26 384/569 |
| 2014/0112607 A1 | 4/2014 | Silverio et al. |
| 2015/0323008 A1 | 11/2015 | Koganei et al. |
| 2017/0204906 A1 | 7/2017 | Koganei et al. |
| 2017/0363146 A1 | 12/2017 | Koganei et al. |
| 2018/0202489 A1* | 7/2018 | Hori ..................... F16C 33/585 |

FOREIGN PATENT DOCUMENTS

| | | |
|---|---|---|
| EP | 1 705 392 A1 | 9/2006 |
| EP | 2 309 143 A1 | 4/2011 |
| FR | 772.478 | 10/1934 |
| JP | 2004-245251 | 9/2004 |
| JP | 2005-83467 | 3/2005 |
| JP | 2007-40520 | 2/2007 |
| JP | 2007-247678 | 9/2007 |
| JP | 2007-255601 | 10/2007 |
| WO | WO 2005/050038 A1 | 6/2005 |
| WO | WO2017047506 * | 3/2017 |

OTHER PUBLICATIONS

English Translation by WIPO of the International Preliminary Report on Patentability dated Oct. 4, 2018 in corresponding International Patent Application No. PCT/JP2017/011775, 12 pgs.
Chinese Office Action dated Jul. 17, 2019 in corresponding Chinese Patent Application No. 201780019166.X.
Extended European Search Report dated Oct. 9, 2019 in corresponding European Patent Application No. 17770365.9.

* cited by examiner

CONTACT SURFACE PRESSURE DISTRIBUTION ON FRONT SIDE

RELATED ART

RELATED ART

DOUBLE-ROW SELF-ALIGNING ROLLER BEARING

CROSS REFERENCE TO THE RELATED APPLICATION

This application is a continuation application, under 35 U.S.C. § 111(a), of international application No. PCT/JP2017/011775, filed Mar. 23, 2017, which claims priority to Japanese patent applications No. 2016-59473, filed Mar. 24, 2016, No. 2016-59474, filed on the same date, No. 2017-45679, filed Mar. 10, 2017, and No. 2017-48527, filed Mar. 14, 2017, the disclosure of which are incorporated by reference in their entirety into this application.

BACKGROUND OF THE INVENTION

Field of the Invention

The present invention relates to a double-row self-aligning roller bearing to be applied to a use in which unequal loads are applied to rollers in two rows arranged in the bearing width direction, for example, to a bearing for supporting a main shaft of a wind turbine generator, industrial machinery or the like.

Description of Related Art

On a bearing that supports a main shaft of a wind turbine generator, an axial load due to wind force acts in addition to a radial load due to weights of blades and a rotor head. In the case where the bearing for supporting the main shaft is a double-row self-aligning roller bearing 41 as shown in FIG. 10, among rollers 44, 45 in two rows interposed between an inner ring 42 and an outer ring 43, only the rollers 45 in one row that is situated in the rear side with respect to an axial load Fa mainly receive the axial load Fa. In other words, the rollers 45 in one row receives both radial load and axial load, while the rollers 44 on the other row receives substantially only the radial load. For this reason, the rollers 45 in the row that receives the axial load have higher contact surface pressures than those of the rollers 44 in the row that receives only the radial load, and thus the rolling surface of the rollers 45 and the raceway surface 43a of the outer ring 43 are more susceptible to surface damage or wear, resulting in shorter rolling fatigue life of the rollers. Therefore, the substantial service life of the entire bearing is limited by the rolling life of the rollers 45 in the row that receives the axial load.

In order to solve this problem, it has been proposed, as in a double-row self-aligning roller bearing 51 shown in FIG. 11, to make lengths L1, L2 of rollers 54, 55 in two rows interposed between an inner ring 52 and an outer ring 53 different from each other so as to make a load capacity of the rollers 55 in the row that receives an axial load larger than a load capacity of the rollers 54 in the row that hardly receives the axial load (Patent Document 1). By setting the roller lengths L1, L2 such that appropriate load capacities can be obtained for the rollers 54, 55 in the respective rows, it is possible to achieve substantially the same rolling life for the rollers 54, 55 in the respective rows and thereby increase the substantial service life of the entire bearing.

Additionally, it has been proposed, as in a double-row self-aligning roller bearing 61 shown in FIG. 12, to make contact angles θ1, θ2 of rollers 64, 65 in two rows interposed between an inner ring 62 and an outer ring 63 different from each other so as to be able to receive a larger axial load with the rollers 65 having the larger contact angle θ2 (Patent Document 2). By setting the contact angles θ1, θ2 such that appropriate load capacities can be obtained for the rollers 64, 65 in the respective rows, it is possible to achieve substantially the same rolling life for the rollers 64, 65 in the respective rows and thereby increase the substantial service life of the entire bearing.

Related Document

Patent Document

[Patent Document 1] WO 2005/050038
[Patent Document 2] U.S. Patent Application Publication No. 2014/0112607

SUMMARY OF THE INVENTION

As stated above, by making the lengths L1, L2 of the rollers 54, 55 in two rows different from each other as in FIG. 11 or by making the contact angles θ1, θ2 of the rollers 64, 65 in two rows different from each other as in FIG. 12, it is possible to make the load capacities of the rollers 55, 65 in the rows that receive the axial loads larger and thereby increase the substantial service life of the entire bearing. However, due to a restriction of dimensional standards for bearings (ISO Standard; JIS B 1512), it is difficult to increase the load capacities of the rollers 55, 65 in the rows that receive the axial loads to appropriate values by using only one of the two techniques. In other words, since the dimensional standards specify an inner diameter, an outer diameter and a bearing width for each nominal number, if the length L2 of the rollers 55 in the row that receives the axial load in FIG. 11 is made too long, the bearing width B exceeds a standard value. Similarly, if the contact angle θ2 of the rollers 65 in the row that receives the axial load in FIG. 12 is made too large, the inner diameter d exceeds a standard value.

In view of the foregoing, it was attempted to combine the technique of making the lengths of the rollers in two rows different from each other and the technique of making the contact angles of the rollers in two rows different from each other in order to equalize the contact surface pressures of the row that receives the axial load and of the row that receives the radial load only, without making the dimensions of respective parts out of the dimensional standards of bearings. In this case, it is important to set the contact angle of the rollers in the row that receives the axial load larger to obtain a sufficiently large load capacity for the rollers.

The object of the present invention is to provide a double-row self-aligning roller bearing which is suitable for use in which the bearing receives an axial load and a radial load, and loads having mutually different magnitudes act on rollers in two rows arranged in an axial direction, and which can achieve a sufficiently large load capacity for the rollers in the row that receives the axial load within the constraint of the dimensional standards.

A double-row self-aligning roller bearing according to a first aspect of the present invention includes an inner ring; an outer ring having a spherical raceway surface; and rollers in two rows arranged in a bearing width direction interposed between the inner ring and the outer ring, the rollers in two rows each having an outer peripheral surface of a cross-sectional shape along the raceway surface of the outer ring, wherein each roller in one row of the two rows has a length different from that of each roller in the other row of the two rows, the length of the longer rollers is equal to or greater than 39% of the bearing width, and a ratio of a contact angle θ1 of the shorter rollers and a contact angle θ2 of the longer rollers is within a range of 1:4 to 1:2.

According to this configuration, by making the length of the rollers in one row of the two rows different from that of the rollers in the other row, the longer rollers have a larger load capacity than that of the shorter rollers. Moreover, by making the contact angle of the longer rollers larger than the contact angle of the shorter rollers, the longer rollers are capable of enduring a large axial load. By making the contact angle of the longer rollers larger than the contact angle of the shorter rollers, the contact angle of the shorter rollers is in turn made small, resulting in an increased load capacity of the shorter rollers for the radial load.

When the double-row self-aligning roller bearing is used under a condition where an axial load and a radial load act, the longer rollers having the larger contact angle bear substantially all the axial load and part of the radial load, and the shorter rollers having the smaller contact angle bear the rest of the radial load. By sharing the axial load and the radial load between the rollers in two rows in such a share proportion, the contact surface pressures on the rollers in respective rows can be equalized. Thus, it is possible to secure a large load capacity of the entire bearing as well as to increase the substantial service life of the entire bearing.

A plurality of double-row self-aligning roller bearings having different ratios of contact angles of rollers in respective rows were prepared, and each double-row self-aligning roller bearing was analyzed for contact surface pressures on the rollers in respective rows under an axial load and a radial load assumed when the bearing is used for supporting a main shaft of a wind turbine generator. As a result, it was found that the contact surface pressures on the rollers in respective rows are most equalized at the ratio of the contact angles of 1:3.

The assumed axial load and radial load refer to an axial load and a radial load when an average wind turbine generator in view of conditions such as its power generation capacity and installation location is most normally operated. Therefore, it is conceivable that an optimum ratio of contact angles may not be 1:3 in a double-row self-aligning roller bearing used in a wind turbine generator that is different from such an average wind turbine generator in these conditions. However, even in that case, the optimum ratio of the contact angles falls within a range of 1:4 to 1:2. Accordingly, it is desirable to set the ratio of the contact angles of the rollers in respective rows within a range of 1:4 to 1:2. The ratio of the contact angles is more preferably be in a range of 1.0:3.5 to 1.0:2.5. It should be noted that if the ratio of the contact angles is [equal to or greater than 1:4], it becomes difficult to dispose longer rollers having a larger contact angle because the thickness of the inner ring is made too thin due to the dimensional constraint.

With respect to this, it was found that a double-row self-aligning roller bearing that falls within the dimensional standards and has a ratio of the contact angles of the rollers of respective rows within the above appropriate range can be obtained by adding a condition that the length of the longer rollers is equal to or greater than 39% of the bearing width.

With respect to magnitudes of the contact angles, for example, the contact angle θ1 of the shorter rollers may be in a range of 5°-7°, the contact angle θ2 of the longer rollers may be in a range of 14°-16°.

In the present invention, a double-row self-aligning roller bearing that falls within the dimensional standards and has a ratio of the contact angles θ1, θ2 of the rollers of respective rows within the above appropriate range can be obtained by adding a condition that the length of the longer rollers is equal to or greater than 39% of and preferably equal to or less than 45% of the bearing width.

In the present invention, each of the rollers may be an asymmetrical roller having a maximum diameter at a position displaced from a center of a roller length thereof, and an intermediate flange configured to guide the rollers in two rows may be provided between the two rows of the rollers on an outer peripheral surface of the inner ring. In the case of the asymmetrical rollers, an induced thrust load is generated. The induced thrust load is supported by the intermediate flange. A combination of the asymmetrical rollers and the intermediate flange allows the rollers to be guided accurately.

In the present invention, the intermediate flange may have a center position in the bearing width direction displaced toward the longer roller side from a position of a point in the bearing width direction at which lines of action defining the contact angles θ1, θ2 of the respective rows intersect.

Thus, by increasing the ratio of the contact angle θ2 of the longer rollers to the contact angle θ1 of the shorter rollers, it is possible to bear a larger axial load with the longer rollers having the larger contact angle.

In the present invention, any one or more of the following configurations (1)-(4) may be employed:

(1) the bearing further includes retainers configured to retain the rollers of the respective rows, wherein each retainer includes an annular portion configured to guide axially inner end faces of the rollers of each row; and a plurality of pillar portions extending in an axial direction from the annular portion and provided at predetermined intervals along a circumferential direction, the pillar portions defining therebetween pockets configured to retain the rollers, and wherein the pillar portions of one of the retainers which is configured to retain the longer rollers have an outer diameter surface inclined by an inclination angle inwardly in a radial direction from a proximal end side to a distal end side;

(2) each of the rollers has a rolling surface (hereinafter, also referred to as "roller rolling surface") formed with a crowning on each end portion on the outer periphery thereof;

(3) each of the rollers has a roller rolling surface coated with a DLC (Diamond-like Carbon) coating; and (4) the inner ring includes an intermediate flange provided between the two rows of the rollers on the outer peripheral surface of the inner ring and configured to guide the rollers in two rows; and small flanges provided on opposite ends of the outer peripheral surface, respectively, and facing axially outer end faces of the rollers of the respective rows, and one of the small flanges that faces the axially outer end faces of the longer rollers is provided with an insertion groove configured to insert therethrough the longer rollers into the bearing.

The predetermined intervals in the configuration (1) are any interval defined depending on designs or the like and may, for example, be defined by calculating an appropriate interval by performing one or both of a test or a simulation.

According to the configuration (1), as the pillar portions of one of the retainers which is configured to retain the longer rollers have the outer diameter surface inclined by an inclination angle inwardly in the radial direction from the proximal end side to the distal end side, pocket surfaces of the retainer can hold the maximum diameter position of the rollers. Thus, it is possible to secure attitude stability of the longer rollers and to easily incorporate the longer rollers into the bearing. According to the configuration (2), as the roller rolling surface is formed with a crowning on each end portion, edge stress can be relaxed. According to the configuration (3), as each of the rollers has the roller rolling surface coated with a DLC coating, wear resistance can be enhanced. Thus, less wear occurs on the roller rolling surface and on the raceway surface of the outer ring, compared with rollers without the DLC coating. According to the configuration (4), as the inner ring has an insertion groove configured to insert therethrough the longer rollers into the bearing on one of the small flanges which faces the axially outer end faces of the longer rollers, incorporation of the longer rollers can be made easier.

This double-row self-aligning roller bearing is suitable for supporting a main shaft of a wind turbine generator. On a double-row self-aligning roller bearing that supports a main shaft of a wind turbine generator, a radial load due to weights of blades and a rotor head and an axial load due to wind force act. One of the two rows of rollers arranged in the bearing width direction receives both of the radial load and the axial load, while the other row receives substantially only the radial load. In that case, by using longer rollers having a larger contact angle as rollers in the row that receives the axial load and shorter rollers having a small contact angle as rollers in the row that receives substantially only the radial load, it is possible to substantially equalize the contact surface pressures of the rollers in the left and right rows.

A double-row self-aligning roller bearing according to a second aspect of the present invention includes an inner ring; an outer ring having a spherical raceway surface; and rollers in two rows arranged in a bearing width direction interposed between the inner ring and the outer ring, the rollers in two rows each having an outer peripheral surface of a cross-sectional shape along the raceway surface of the outer ring, wherein each roller in one row of the two rows has a length different from that of each roller in the other row of the two rows, the longer rollers have a contact angle larger than a contact angle of the shorter rollers, an intermediate flange is provided at a portion between the two rows of the rollers on an outer peripheral surface of the inner ring, and the intermediate flange has a center position in the bearing width direction displaced toward a side of the longer rollers from a position of a point in the bearing width direction at which lines of action defining the contact angles of the respective rows intersect.

According to this configuration, by making the length of the rollers in one row of the two rows different from that of the rollers in the other row, the longer rollers have a larger load capacity than that of the shorter rollers. Moreover, by making the contact angle of the longer rollers larger than the contact angle of the shorter rollers, the longer rollers are capable of enduring a large axial load. By making the contact angle of the longer rollers larger than the contact angle of the shorter rollers, the contact angle of the shorter rollers is in turn made small, resulting in an increased load capacity of the shorter rollers for the radial load.

When the double-row self-aligning roller bearing is used under a condition where an axial load and a radial load act, the longer rollers having the larger contact angle bear substantially all the axial load and part of the radial load, and the shorter rollers having the smaller contact angle bear the rest of the radial load. By sharing the axial load and the radial load between the rollers in two rows in such a share proportion, the contact surface pressures on the rollers in respective rows can be equalized. Thus, it is possible to secure a large load capacity of the entire bearing as well as to increase the substantial service life of the entire bearing.

In the case of this configuration, in addition to the effect of the double-row self-aligning roller bearing, in particular, by displacing the center position of the intermediate flange in the bearing width direction toward the side of the longer rollers from the position of the point in the bearing width direction at which the lines of action defining the contact angles $\theta 1$, $\theta 2$ of the respective rows intersect, it is possible to increase the ratio of the contact angle $\theta 2$ of the longer rollers to the contact angle $\theta 1$ of the shorter rollers. Thus, it is possible to bear a larger axial load with the longer rollers having the larger contact angle. Therefore, the double-row self-aligning roller bearing of this configuration is also suitable for supporting a main shaft of a wind turbine generator.

BRIEF DESCRIPTION OF THE DRAWINGS

In any event, the present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
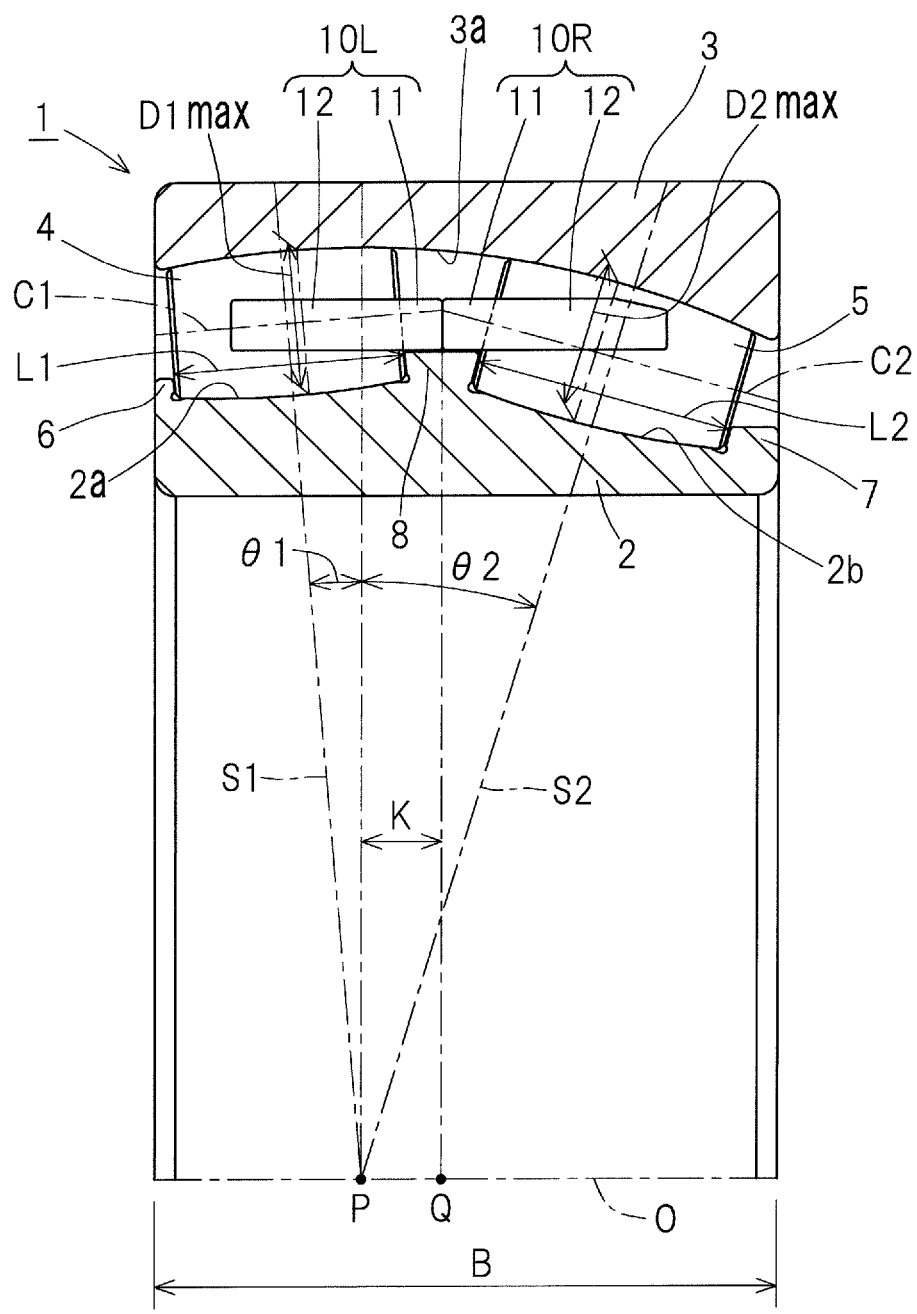
FIG. 1 is a longitudinal section view of a double-row self-aligning roller bearing according to a first embodiment of the present invention.

The first embodiment of the present invention is described with reference to FIG. 1. The double-row self-aligning roller bearing 1 includes an inner ring 2, an outer ring 3 and rollers 4, 5 in two rows, that is, left and right rows, arranged in a bearing width direction interposed between the inner ring 2 and the outer ring 3. The outer ring 3 has a spherical raceway surface 3a, and each of the rollers 4, 5 in the left and right rows has an outer peripheral surface of a cross-sectional shape along the raceway surface 3a of the outer ring 3. In other words, the outer peripheral surfaces of the rollers 4, 5 are rotation curved surfaces obtained by rotating respective circular arcs along the raceway surface 3a of the outer ring 3 about center lines C1, C2. The inner ring 2 is formed with raceway surfaces 2a, 2b in double rows having cross-sectional shapes along the outer peripheral surfaces of the rollers 4, 5 in the respective left and right rows. The outer peripheral surface of the inner ring 2 has opposite ends provided with flanges (small flanges) 6, 7, respectively. The outer peripheral surface of the inner ring 2 has a center portion, that is, a portion between the rollers 4 in the left row and the rollers 5 in the right row, provided with an intermediate flange 8.

Figure 2:
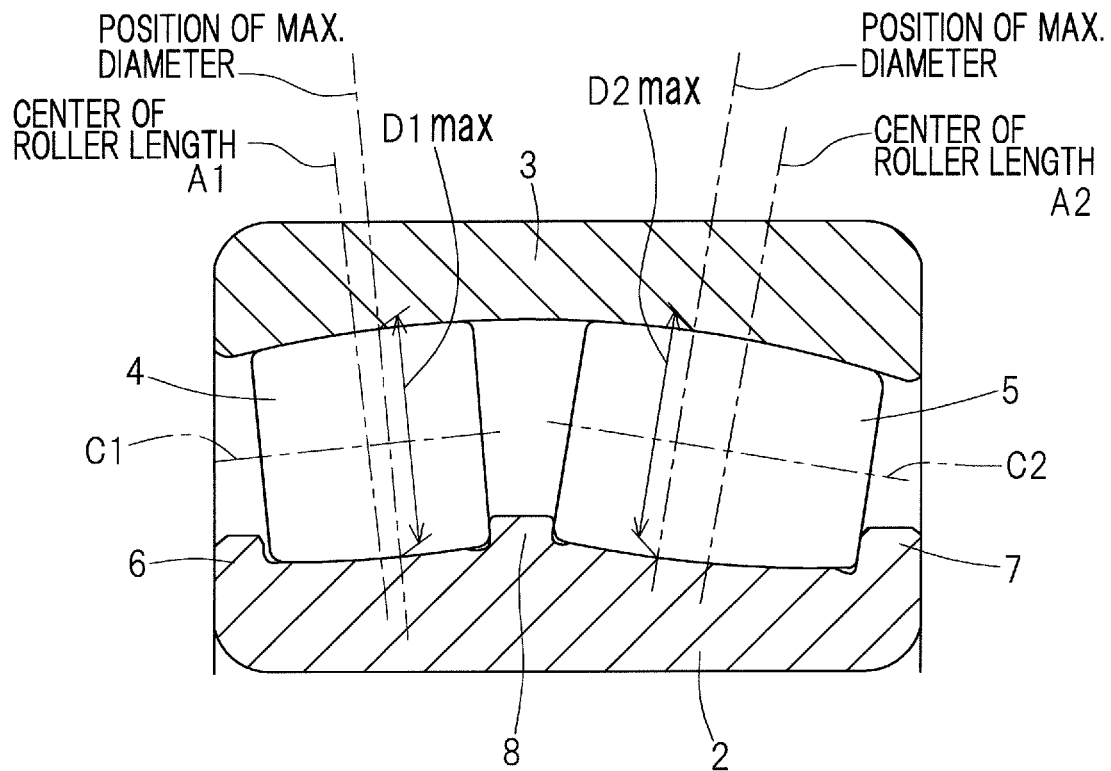
FIG. 2 illustrates asymmetrical rollers.

As exaggeratedly shown in FIG. 2, the rollers 4, 5 in the respective left and right rows are asymmetrical rollers having respective maximum diameters $D1_{max}$, $D2_{max}$ at positions displaced from centers A1, A2 of the roller lengths thereof. The position of the maximum diameter $D1_{max}$ of the rollers 4 in the left row is on the right side of the center A1 of the roller length, and the position of the maximum diameter $D2_{max}$ of the rollers 5 in the right row is on the left side of the center A2 of the roller length. Induced thrust loads are generated to the rollers 4, 5 in the left and right rows, which are in the form of such asymmetrical rollers. The intermediate flange 8 of the inner ring 2 is provided for receiving the induced thrust loads. A combination of the asymmetrical rollers 4, 5 and the intermediate flange 8 allows the rollers to be guided accurately because the rollers 4, 5 are guided at three locations, i.e. the inner ring 2, the outer ring 3 and the intermediate flange 8.

As shown in FIG. 1, the first rollers 4 in the left row and the second rollers 5 in the right row have the same maximum diameters $D1_{max}$, $D2_{max}$ and different lengths L1, L2 along the center lines C1, C2 from each other. The length L2 of the longer second rollers 5 is equal to or greater than 39% of the bearing width B.

The longer second rollers 5 have a contact angle θ2 larger than a contact angle θ1 of the short first rollers 4. A ratio of the contact angle θ1 of the short rollers 4 relative to the contact angle θ2 of the longer second rollers 5 is set within the range of 1:4 to 1:2. The preferable ratio of the contact angles θ1, θ2 is 1:3, the reason of which will be explained later. Particularly, the range of the contact angle θ1 is, for example, 5°-7°, and the range of the contact angle θ2 is, for example, 140-16°.

The position of a point P in the bearing width direction at which lines of action S1, S2 which define the contact angles θ1, θ2 of the respective rows intersect is displaced by a distance K toward a side of the short rollers 4 from a center position Q of the intermediate flange 8 in the bearing width direction. Thus, it is possible to make the contact angle θ2 of the longer rollers 5 larger without making the longer rollers 5 unnecessarily long. It should be noted that the lines of action S1, S2 are defined as lines along which a synthetic force of forces acting on contact portions between the rollers 4, 5 and the inner and outer rings 2, 3 acts. The point P at which the lines of action S1, S2 intersect is located on a bearing center axis O.

The rollers 4, 5 in the left and right rows are retained by retainers 10L, 10R, respectively. The first retainer 10L for the left row includes an annular portion 11 and a plurality of pillar portions 12 extending from the annular portion 11 toward the left side, and the rollers 4 in the left row are retained in pockets between the respective pillar portions 12. The second retainer 10R for the right row includes an annular portion 11 and a plurality of pillar portions 12 extending from the annular portion 11 toward the right side, and the rollers 5 in the right row are retained in pockets between the respective pillar portions 12.

The double-row self-aligning roller bearing 1 of this configuration is used in a use in which the bearing receives an axial load and a radial load, and loads having mutually different magnitudes act on rollers in left and right rows, for example, a bearing for supporting a main shaft of a wind turbine generator. In that case, the double-row self-aligning roller bearing 1 is installed such that the rollers 4 in the left row are located on a side close to rotor blades (the front side) and that the rollers 5 in the right row are located on a side away from the rotor blades (the rear side). In this way, the rollers 5 in the right row having the longer length L2 and the larger contact angle θ2 bear substantially all the axial load and part of the radial load, and the rollers 4 in the left row having the shorter length L1 and a smaller contact angle θ1 bear the rest of the radial load.

By properly setting the lengths L1, L2 and the contact angles θ1, θ2 of the rollers 4, 5, loads can be shared in a proportion according to the load capacities of the rollers 4, 5 in the left and right rows. As a result, the surface pressures of the rollers 4, 5 in the left and right rows are equalized. Thus, it is possible to secure a large load capacity of the entire bearing as well as to increase the substantial service life of the entire bearing.

Figure 3:
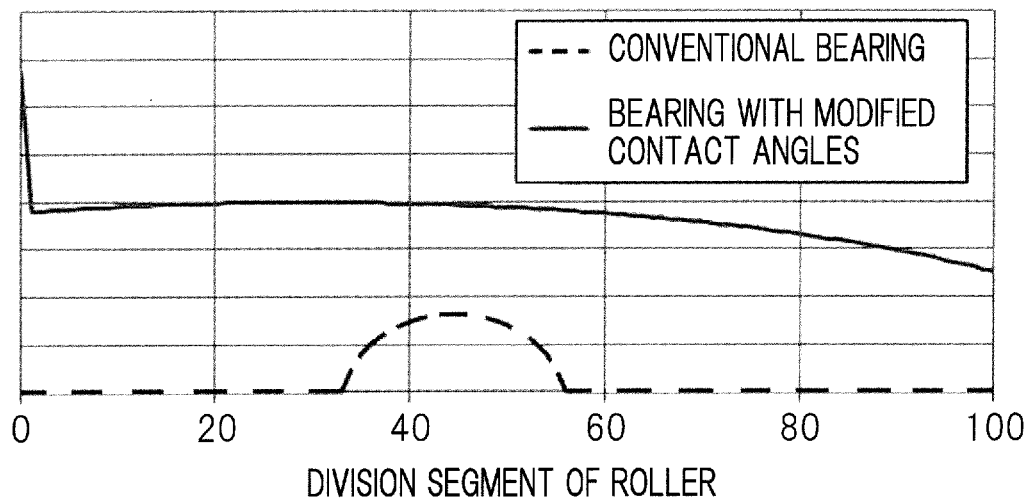
FIG. 3 is a graph showing a result of the analysis for contact surface pressure distribution on the rollers on the front sides when a synthetic load of an axial load and a radial load is applied to the double-row self-aligning roller bearing and a conventional double-row self-aligning roller bearing.
Figure 10:
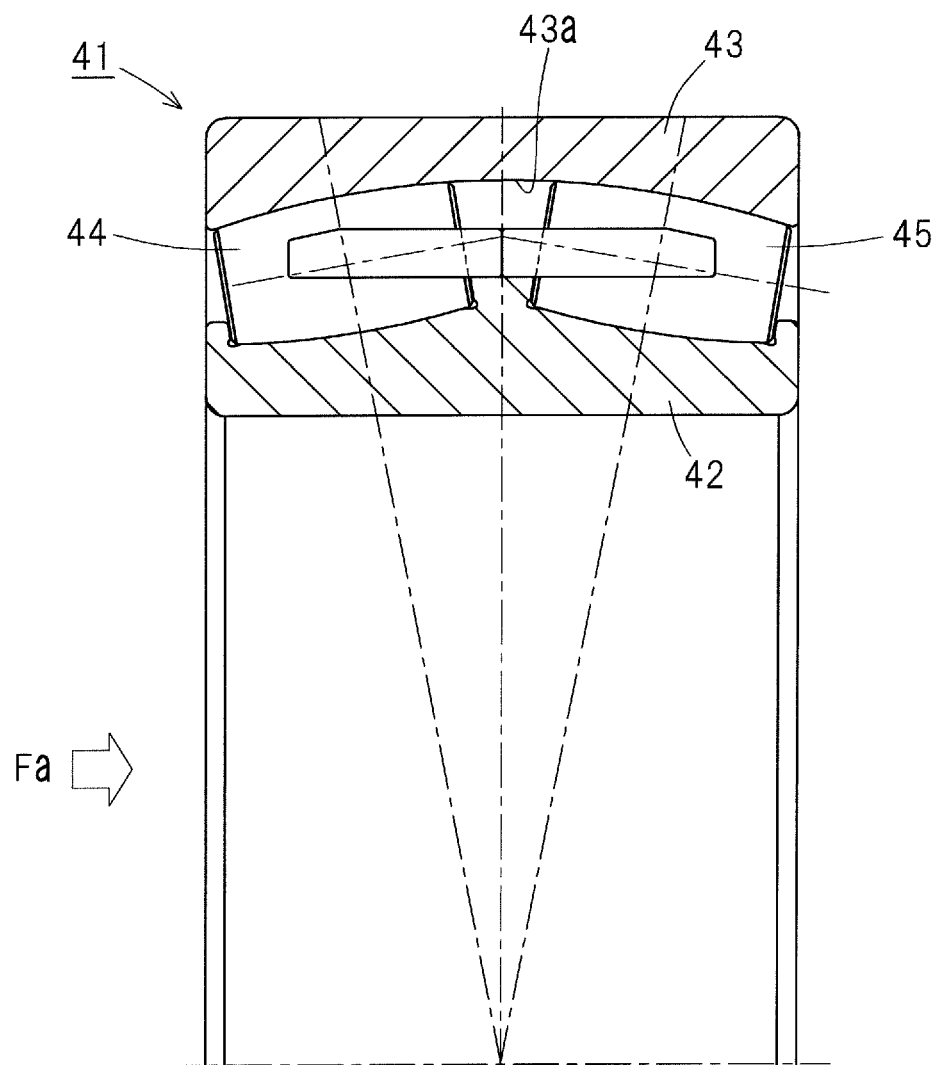
FIG. 10 is a longitudinal section view of a conventional general double-row self-aligning roller bearing according to the related art.
Figure 11:
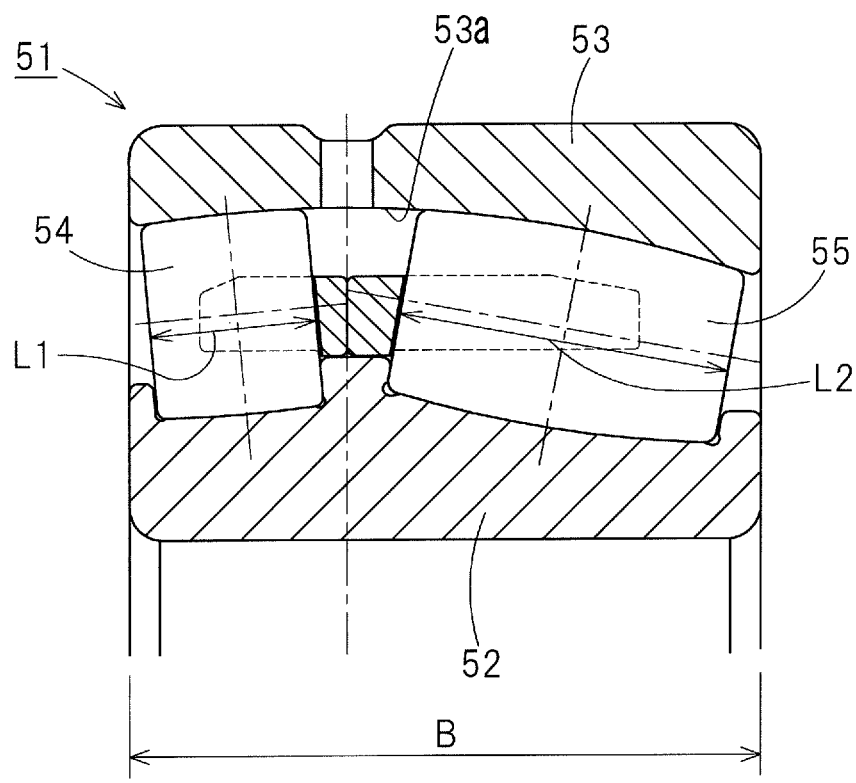
FIG. 11 is a longitudinal section view of a double-row self-aligning roller bearing of the first proposed example according to the related art.
Figure 12:
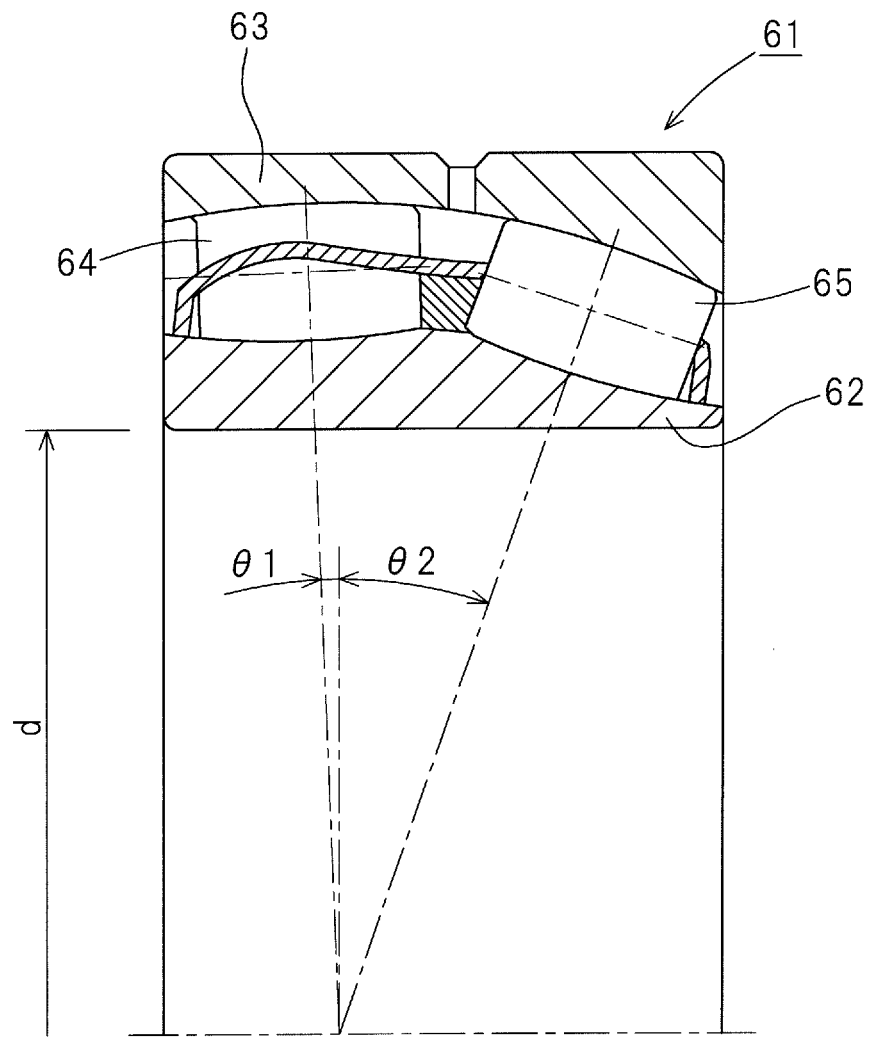
FIG. 12 is a longitudinal section view of a double-row self-aligning roller bearing of the second proposed example according to the related art.

For a conventional double-row self-aligning roller bearing 41 shown in FIG. 10 and the double-row self-aligning roller bearing 1 of the present invention shown in FIG. 1, contact surface pressures of the rollers in the left and right rows were analyzed under a synthetic load of an axial load and a radial load assumed when each bearing is used for supporting a main shaft of a wind turbine generator. FIG. 3 shows contact surface pressure distributions on the front sides, i.e. on the rollers 44, 4 in the left rows, and FIG. 4 shows the analytical result of contact surface pressure distributions on the rear sides, i.e. on the rollers 45, 5 in the right rows.

Figure 4:
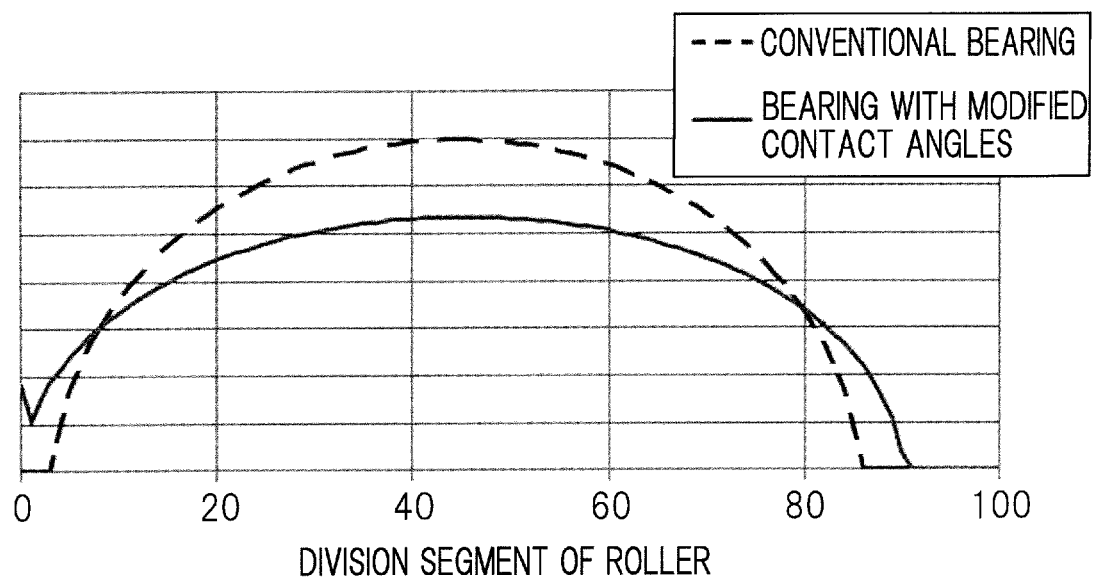
FIG. 4 is a graph showing a result of the analysis for contact surface pressure distribution on the rollers on the rear sides when a synthetic load of an axial load and a radial load is applied to the double-row self-aligning roller bearing and a conventional double-row self-aligning roller bearing.

From FIG. 3 and FIG. 4, the following is revealed. The conventional bearing in FIG. 10 has lower contact surface pressures on the front side and higher contact surface pressures on the rear side, and thus loads are unequally shared between the front side and the rear side. In contrast, the bearing with modified contact angles in FIG. 1 has equalized contact surface pressures with reduced difference between contact surface pressures in respective rows because contact surface pressures are distributed over the entirety of the rollers on the front side, reducing a maximum value of contact surface pressures on the rear side.

Figure 5:
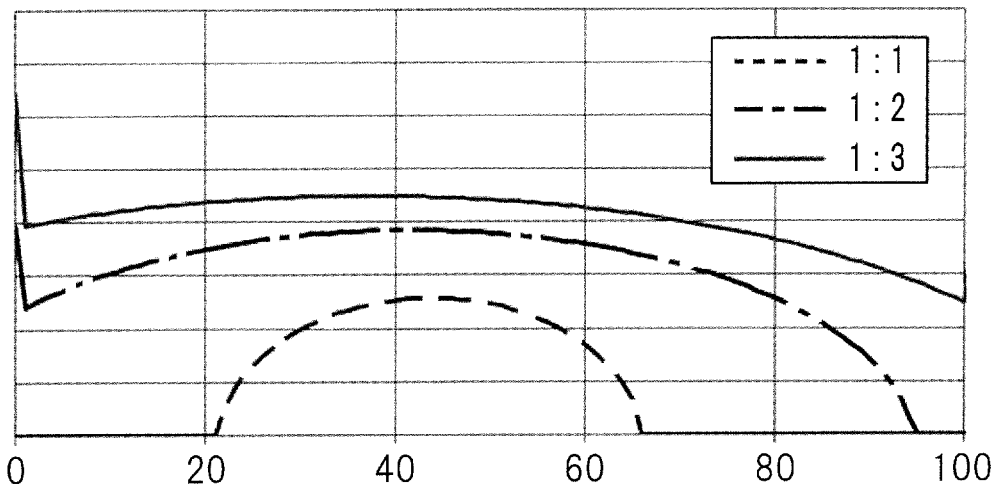
FIG. 5 is a graph showing a result of the analysis for contact surface pressure distribution on the rollers on the front sides when a synthetic load of an axial load and a radial load is applied to plural types of double-row self-aligning roller bearings having different ratios of the contact angles of the rollers in respective rows.
Figure 6:
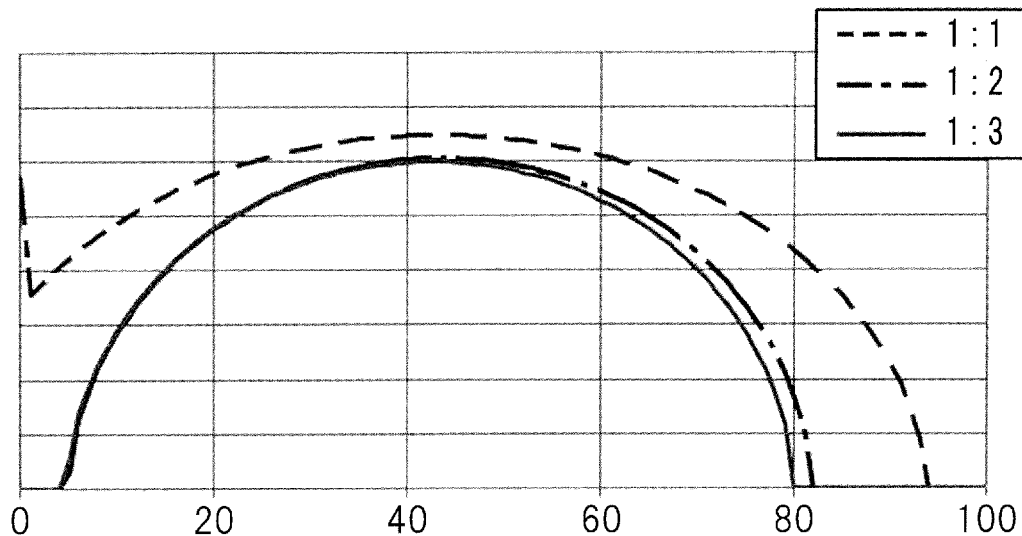
FIG. 6 is a graph showing a result of the analysis for contact surface pressure distribution on the rollers on the rear sides when a synthetic load of an axial load and a radial load is applied to plural types of double-row self-aligning roller bearings having different ratios of the contact angles of the rollers in respective rows.

Three types of double-row self-aligning roller bearings each having a different ratio of the contact angle θ1 of the rollers 4 in the left row and the contact angle θ2 of the rollers 5 in the right row were prepared, and contact surface pressures on the rollers in the left and right rows were analyzed in the same way. FIG. 5 shows the analytical result of contact surface pressure distributions on the rear sides, i.e. on the rollers 5 in the left rows, and FIG. 6 shows the analytical result of contact surface pressure distributions on the front sides, i.e. on the rollers 4 in the right rows. The bearing having the ratio of the contact angles of 1:1 is a conventional one, and the bearings having the ratios of the contact angles of 1:2, 1:3 are those of the present invention having modified contact angles.

From FIG. 5 and FIG. 6, the following is revealed. When the contact surface pressure distributions are compared for the respective ratios of the contact angles, the bearing having the ratio of the contact angles of 1:3 has most equalized contact surface pressures between the front side and the rear side. The bearing having the ratio of the contact angles of 1:2 is less equalized when compared with the bearing having the ratio of the contact angles of 1:3 but is sufficiently equalized when compared with the bearing having the ratio of the contact angles of 1:1. As can be seem from FIG. 1, when the contact angle θ2 of the rollers 5 is made larger, it becomes difficult to dispose the longer rollers 5 because the thickness of the inner ring 2 is made too thin due to the dimensional constraint. In view of these, it is desirable to set the ratio of the contact angles equal to or greater than 1:4 and equal to or less than 1:2. The ratio of the contact angles is more preferably be in a range of 1.0:3.5 to 1.0:2.5.

It should be noted that the assumed axial load and radial load refer to an axial load and a radial load when an average wind turbine generator in view of conditions such as its power generation capacity and installation location is most normally operated. Therefore, it is conceivable that an optimum ratio of contact angles may not be 1:3 in a double-row self-aligning roller bearing used in a wind turbine generator that is different from such an average wind turbine generator in these conditions. However, even in that case, the optimum ratio of the contact angles falls within a range of 1:4 to 1:2.

Figure 7:
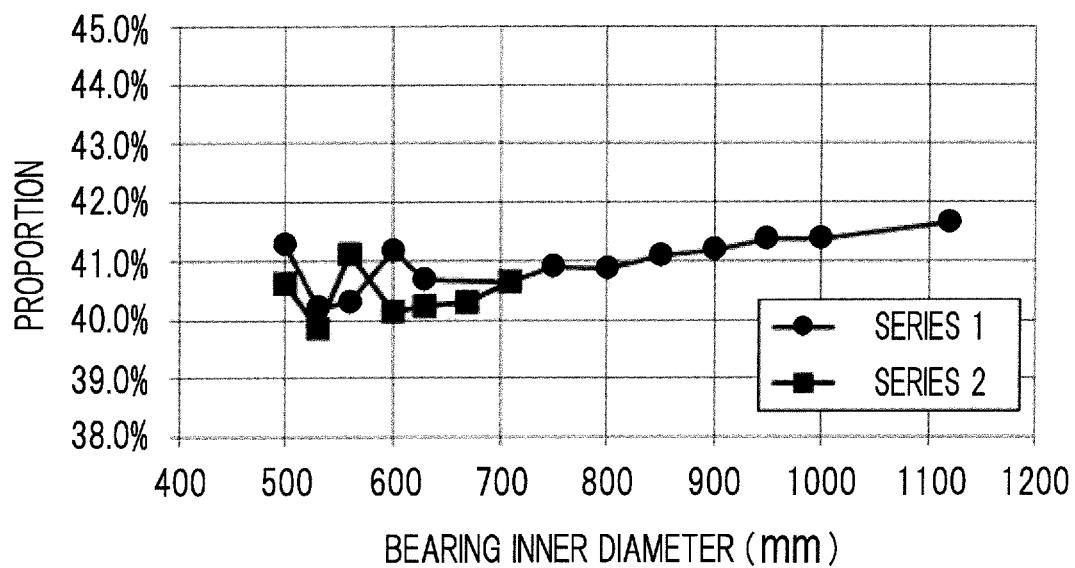
FIG. 7 shows ratios of roller lengths to bearing widths for plural types of conventional double-row self-aligning roller bearings in the same graph.

Moreover, a double-row self-aligning roller bearing that falls within the dimensional standards and has a ratio of the contact angles of the rollers of respective rows within the above appropriate range can be obtained by adding a condition that the length L2 of the longer rollers 5 is equal to or greater than 39% of the bearing width B. Also, for a conventional double-row self-aligning roller bearing, the proportion of the length L2 of the rollers 5 relative to the bearing width B was examined. As a result, as shown in FIG. 7, the proportion was found to be equal to or greater than 39%. In addition, the proportion was also found to be equal to or less than 45%. The dimensional standards are standards that specify an inner diameter, an outer diameter and a bearing width.

Figure 8:
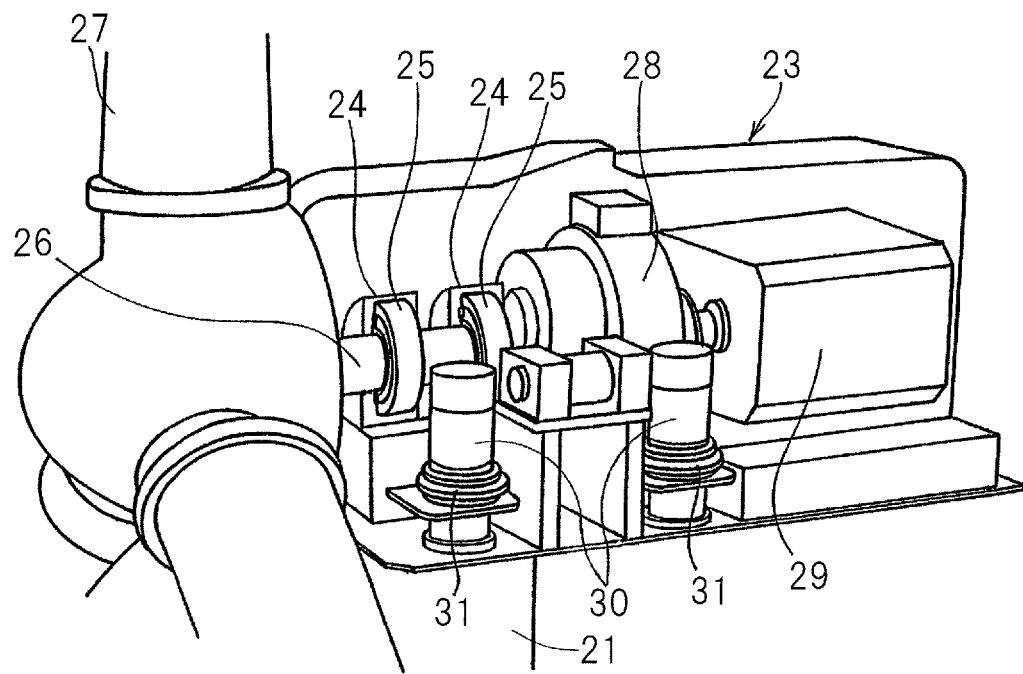
FIG. 8 is a perspective view shown by sectioning a part of a main shaft support device of a wind turbine generator as an example.
Figure 9:
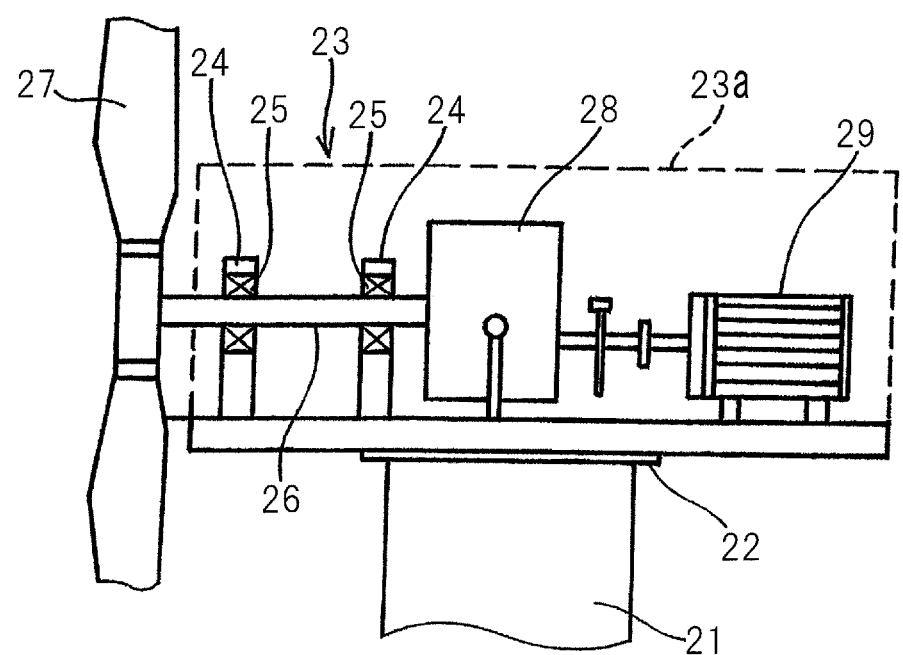
FIG. 9 is a cutaway side view of the main shaft support device.

FIG. 8 and FIG. 9 illustrate an example of a main shaft support device of a wind turbine generator. A casing 23a of a nacelle 23 is horizontally turnably disposed on a support 21 via a revolving seat bearing 22 (FIG. 9). A main shaft 26 is rotatably fitted within the casing 23a of the nacelle 23 via main shaft support bearings 25 disposed in bearing housings 24, and blades 27 that serve as rotor blades are attached to a portion of the main shaft 26 projected outside of the casing 23a. The other end of the main shaft 26 is connected to a speed increasing gear 28, and an output shaft of the speed increasing gear 28 is coupled to a rotor shaft of a power generator 29. The nacelle 23 is revolved to any angle by revolving motors 30 via reduction gears 31. The illustrated example has two main shaft support bearings 25 arranged in series but may have a single main shaft support bearing.

Another embodiment will be described. In the following description, the same reference numerals are used to denote parts that correspond to previously described parts in the respective embodiments, and overlapping description is omitted. Where only a part of a configuration is described, the rest of the configuration is to be construed as being the same as the previously described embodiments unless otherwise indicated. The same configurations provide the same effects. It is possible not only to combine the parts that have been particularly described in the respective embodiments but also to partly combine the embodiments unless there is any hindrance to such a combination.

A double-row self-aligning roller bearing according to the other embodiment will be described with reference to FIG. 13 to FIG. 17. As in the second embodiment shown in FIG. 13, the double-row self-aligning roller bearing 1A includes (1) a retainer 10RA with an inclination angle, (2) a crowning 13, (3) a DLC coating 14, and (4) an insertion groove 15. The bearing may not necessarily include all the configurations (1)-(4) and may include at least one of them.

<(1) Regarding the Retainer with an Inclination Angle or the Like>

Figure 13:
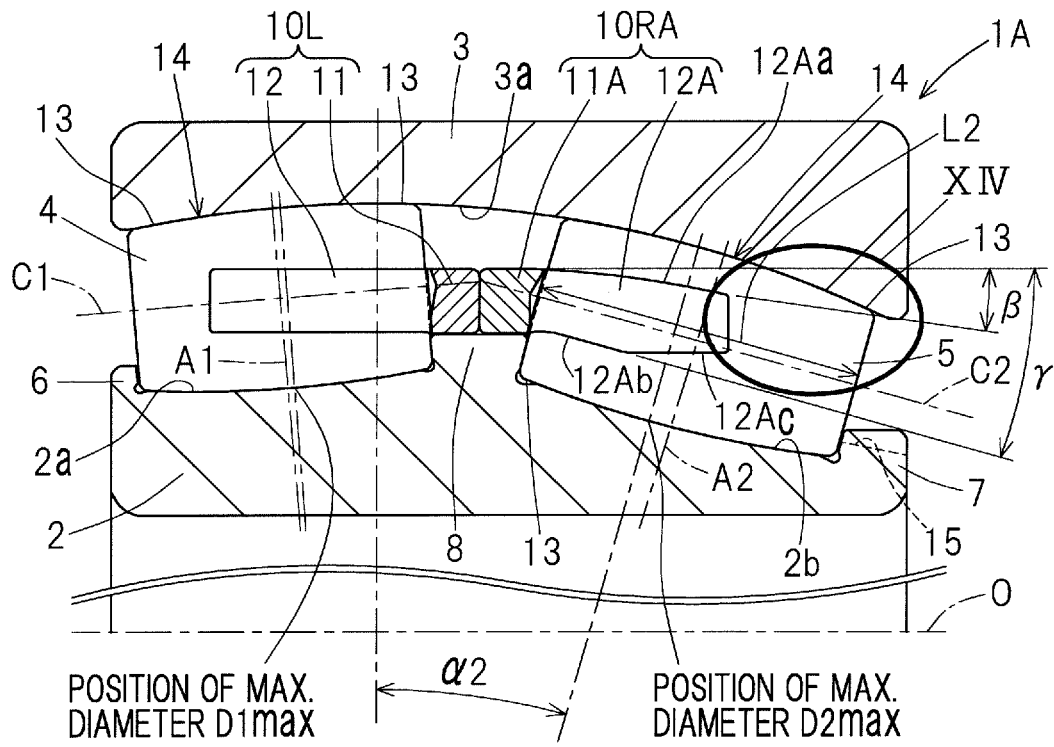
FIG. 13 is a longitudinal section view of a double-row self-aligning roller bearing according to a second embodiment of the present invention.

The retainer 10RA for the right row shown in FIG. 13 is a retainer configured to retain rollers 5 having a longer axial length. The pillar portions 12A of the retainer 10RA has an outer diameter surface 12Aa inclined by an inclination angle 3 inwardly in the radial direction from a proximal end side to a distal end side. The inclination angle f is an angle relative to a bearing center axis O. The inclination angle β of the outer diameter surface 12Aa of the retainer 10RA is set to be within a range that is greater than zero and equal to or less than a maximum diameter angle α2 of the rollers 5 in the right row (0<β≤α2). The maximum diameter angle α2 is an inclination angle of the position of the maximum diameter $D2_{max}$ of the rollers 5 in the right row relative to a plane perpendicular to the bearing center axis O.

In this example, an inner diameter surface of the pillar portions 12A in the retainer 10RA for the right row has an inclined surface portion 12Ab and a flat surface portion 12Ac leading to the inclined surface portion 12Ab. The inclined surface portion 12Ab extends from the proximal end side of the inner diameter surface of the pillar portions 12A to a vicinity of an intermediate location of the inner diameter surface in the axial direction and has an inclination angle γ such that it is inclined inwardly in the radial direction from the proximal end side to the vicinity of an intermediate location in the axial direction. The inclination angle γ is also an angle relative to the bearing center axis O, and the inclination angle γ is set to be equal to or greater than the inclination angle β (γ≥β). In this example, the inclination angle γ is set to be greater than the inclination angle θ by some degrees. It should be noted that it is not limited to this relation (γ≥β). The flat surface portion 12Ac is a flat surface that extends in the axial direction from a tip edge of the inclined surface portion 12Ab and is in parallel with the bearing center axis O. The other retainer 10L for the left row is configured such that the outer diameter surface and the inner diameter surface of the pillar portions 12 do not have an inclination angle, that is, configured to be in parallel with the bearing center axis O.

<(2) Regarding the Crowning 13>

Figure 14:
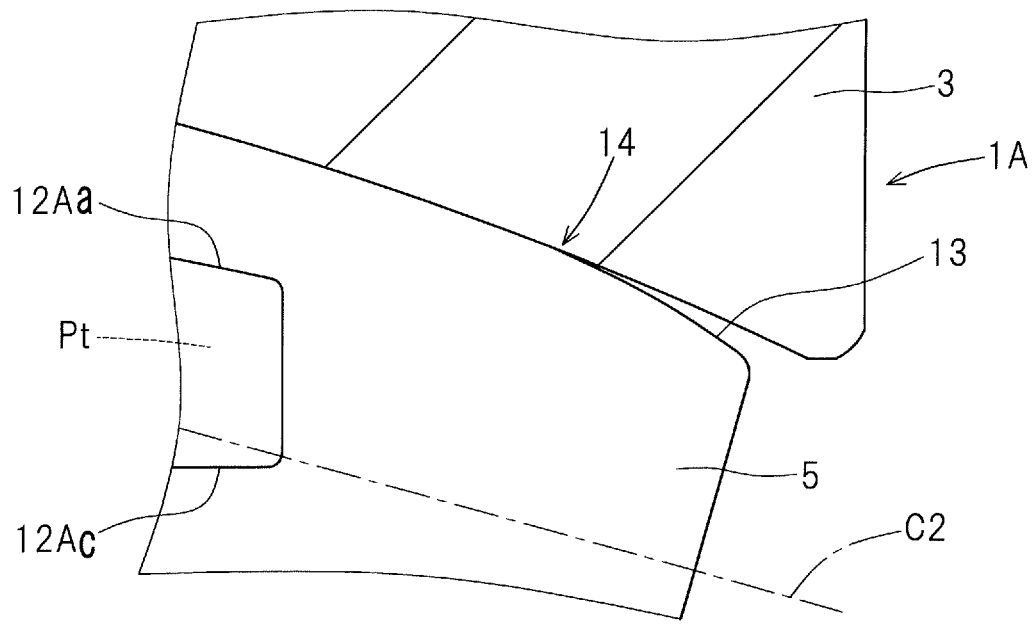
FIG. 14 is an enlarged section view of a part of the double-row self-aligning roller bearing.

FIG. 14 is an enlarged section view of a part (XIV portion) of FIG. 13. As shown in FIG. 13 and FIG. 14, each of the rollers 4, 5 in the left and right rows has a roller rolling surface formed with a crowning 13 on each end portion. The roller rolling surface of this example is formed in a logarithmic crowning shape represented by a logarithmic curve. However, the crowning 13 is not limited to the logarithmic crowning shape, and, for example, the roller rolling surface may be formed in a combined R crowning shape. The combined R crowning shape with a larger drop quantity can be formed by making an R dimension of the crowning portion smaller than a reference R of the roller rolling surface.

<(3) Regarding the DLC Coating 14>

Figure 15:
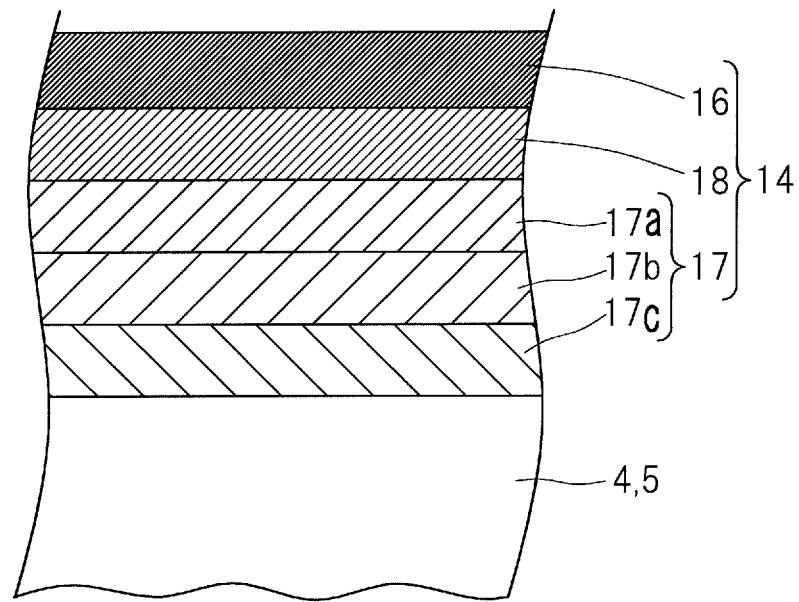
FIG. 15 is an enlarged section view showing the DLC coating and the like of a roller of the double-row self-aligning roller bearing.

As shown in FIG. 15, each of the rollers 4, 5 has a roller rolling surface coated with a DLC coating 14. The DLC coating 14 of this example employs a multilayered structure that is highly adhesive to the rollers 4, 5 that are a base material. The DLC coating 14 includes a surface layer 16, an intermediate layer 17 and a stress relaxing layer 18. The surface layer 16 is a film mainly composed of DLC, in which only graphite of a solid target is used as a carbon supply source to reduce an amount of hydrogen mixed thereto. The intermediate layer 17 is a layer mainly composed of at least Cr or W and formed between the surface layer 16 and the base material. The stress relaxing layer 18 is formed between the intermediate layer 17 and the surface layer 16.

The intermediate layer 17 has a structure including a plurality of sublayers having different compositions, and FIG. 15 shows a three-layered structure having sublayers 17a-17c as an example. For example, a sublayer 17c mainly composed of Cr is formed on the surface of the base material, then a sublayer 17b mainly composed of W is formed thereon, and further a sublayer 17a mainly composed of W and C is formed thereon. FIG. 15 shows a three-layered structure as an example, but the intermediate layer 17 may include a greater or smaller number of sublayers as necessary.

The sublayer 17a that adjoins the stress relaxing layer 18 can have enhanced adhesiveness to the intermediate layer 17 and the stress relaxing layer 18 by being mainly composed of carbon and a metal that mainly composes the sublayer 17b which the sublayer 17a adjoins on the other side. For example, when the sublayer 17a is mainly composed of W and C, its adhesiveness can be further enhanced by decreasing a W content while increasing a C content from the side of the intermediate sublayer 17b that is mainly composed of W toward the side of the stress relaxing layer 18 that is mainly composed of C (composition gradient).

The stress relaxing layer 18 is a graded layer that is mainly composed of C and has hardness continuously or stepwisely increasing from the side of the intermediate layer 17 toward the side of the surface layer 16. Particularly, the stress relaxing layer 18 is a DLC graded layer that can be formed by using a graphite target and increasing a bias voltage to the base material continuously or stepwisely in the UBMS method. The reason why the hardness increases continuously or stepwisely is that a composition ratio of the graphite structure ($SP^2$) and the diamond structure ($SP^3$) in the DLC structure shifts toward the latter due to increase in the bias voltage.

The surface layer 16 is a film that is extendedly formed after the stress relaxing layer 18 and is mainly composed of DLC and, in particular, is a DLC film that has a reduced hydrogen content in the structure. The reduction of the hydrogen content enhances wear resistance. In order to form such a DLC film, for example, the UBMS method is used to prevent mixing of hydrogen and compounds containing hydrogen into ingredients and sputtering gas used for sputtering processing.

For the film formation method for the stress relaxing layer 18 and the surface layer 16, the case where the UBMS method is employed is described as an example, but any known film formation method may be employed as long as it can change hardness continuously or stepwisely. It is preferable that the total thickness of the multi-layered film including the intermediate layer 17, the stress relaxing layer 18 and the surface layer 16 is between 0.5 μm and 3.0 μm. A total film thickness outside this range is not preferable because the film becomes inferior in wear resistance and mechanical strength if the total film thickness is less than 0.5 μm, while the film tends to be easily peeled off if the total film thickness is greater than 3.0 μm. It should be noted that although the DLC coating 14 is provided only on the outer peripheral surfaces of the respective rollers 4, 5 in this example, the DLC coating 14 may further be provided on end faces on opposite sides of the respective rollers 4, 5. In particular, if the DLC coating 14 is provided on the end faces of the respective rollers 4, 5 which are on the sides guided by intermediate flange 8 (FIG. 13), the end faces of the respective rollers 4, 5 become less prone to wear, and thus this can enhance wear resistance of the rollers 4, 5.

<(4) Regarding the Insertion Groove>

Figure 16:
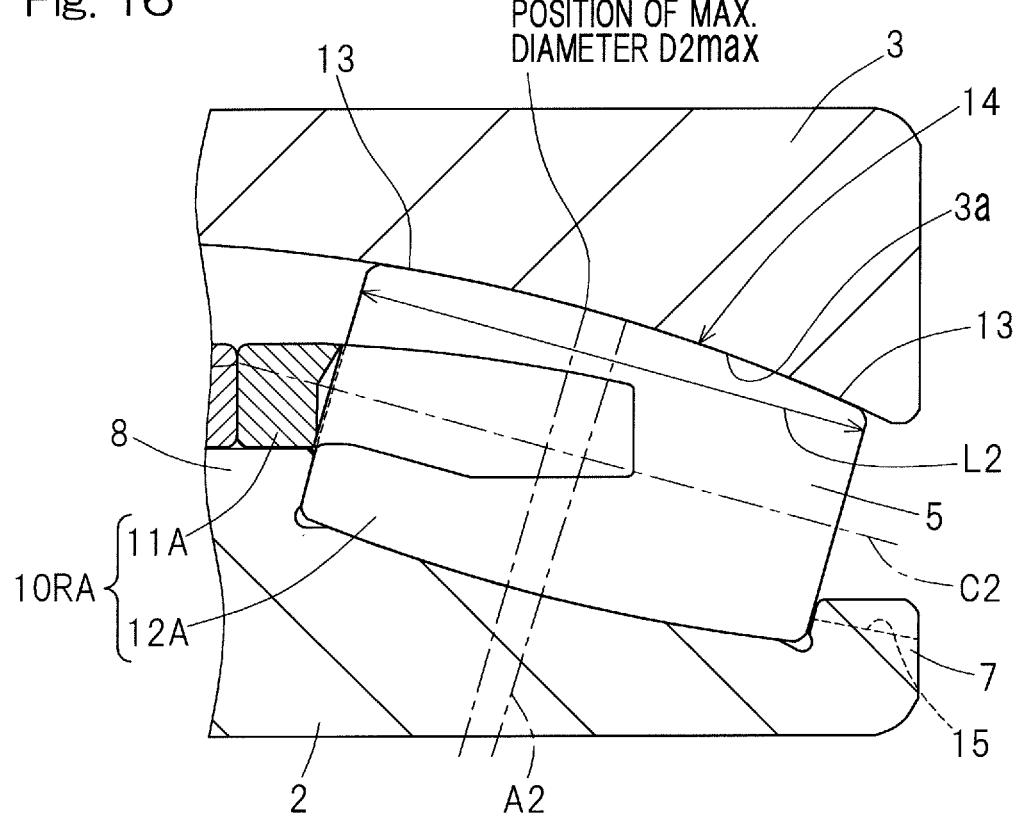
FIG. 16 is an enlarged section view showing the insertion groove etc. of the inner ring of the double-row self-aligning roller bearing.
Figure 17:
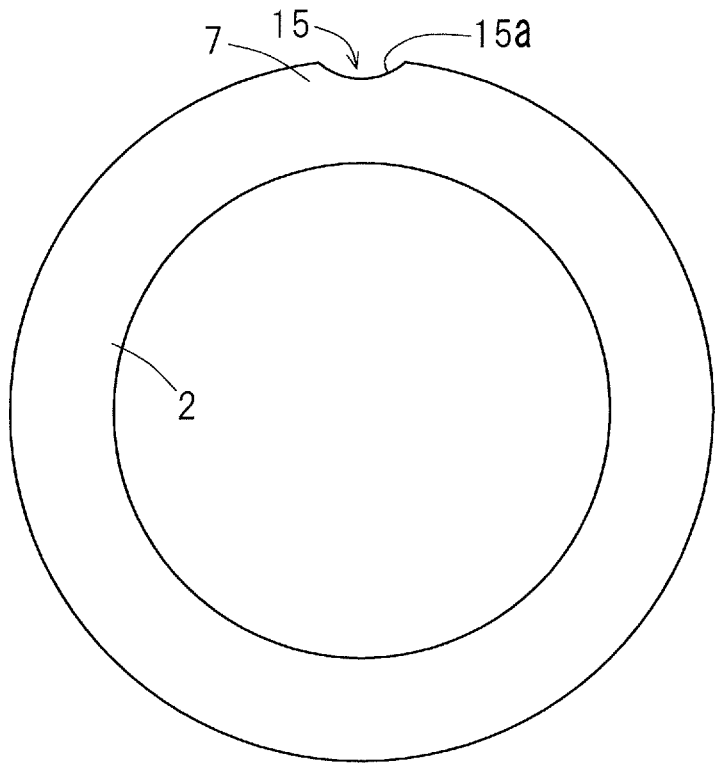
FIG. 17 is an end face view showing the insertion groove etc. of the inner ring as seen from the axial direction.

As shown in FIG. 16, the inner ring 2 includes an insertion groove 15 configured to insert therethrough the longer second rollers 5 into the bearing on the second small flange 7 of the first and second small flanges 6, 7 (FIG. 13) which faces the axially outer end faces of the longer second rollers 5. As shown in FIG. 17, the second small flange 7 of the inner ring 2 is provided with an insertion groove 15 of a circular arc shape at a location in the circumferential direction. A radius of curvature of a circular arc 15a of the insertion groove 15 is suitably set according to the maximum diameter of the rollers 5 (FIG. 16) to be inserted. Otherwise, similar features as the previously described embodiments are employed.

<Regarding the Effect>

According to the double-row self-aligning roller bearing 1A according to the other embodiment, as the respective rollers 4, 5 have the roller rolling surfaces coated with the DLC coating 14, wear resistance can be enhanced. Thus, less wear occurs on the roller rolling surface and on the raceway surface 3a of the outer ring 3, compared with rollers without the DLC coating. Moreover, as the roller rolling surface is formed with a crowning 13 on each end portion of, edge stress can be relaxed.

As the pillar portions 12A of one (second) retainer 10RA of the retainers which is configured to retain the longer rollers 5 have the outer diameter surface 12Aa inclined by the inclination angle 3 inwardly in the radial direction from the proximal end side to the distal end side, pocket Pt surfaces of the retainer 10RA can hold the maximum diameter position of the rollers 5. In other words, as the retainer 10RA has the inclination angle β as described above, the pocket Pt surfaces of the retainer 10RA are maintained near a pitch circle diameter of the rollers 5, and the pocket Pt surfaces of the retainer 10RA can smoothly hold the maximum diameter position of the rollers 5 during bearing operation. Thus, it is possible to secure attitude stability of the longer rollers 5 and to easily incorporate the longer rollers 5 into the bearing. As the inner ring 2 includes the insertion groove 15 configured to insert therethrough the longer second rollers 5 into the bearing on the second small flange 7 of the respective small flanges 6, 7 which faces the axially outer end faces of the longer second rollers 5, incorporation of the longer rollers 5 can be made easier.

Figure 18:
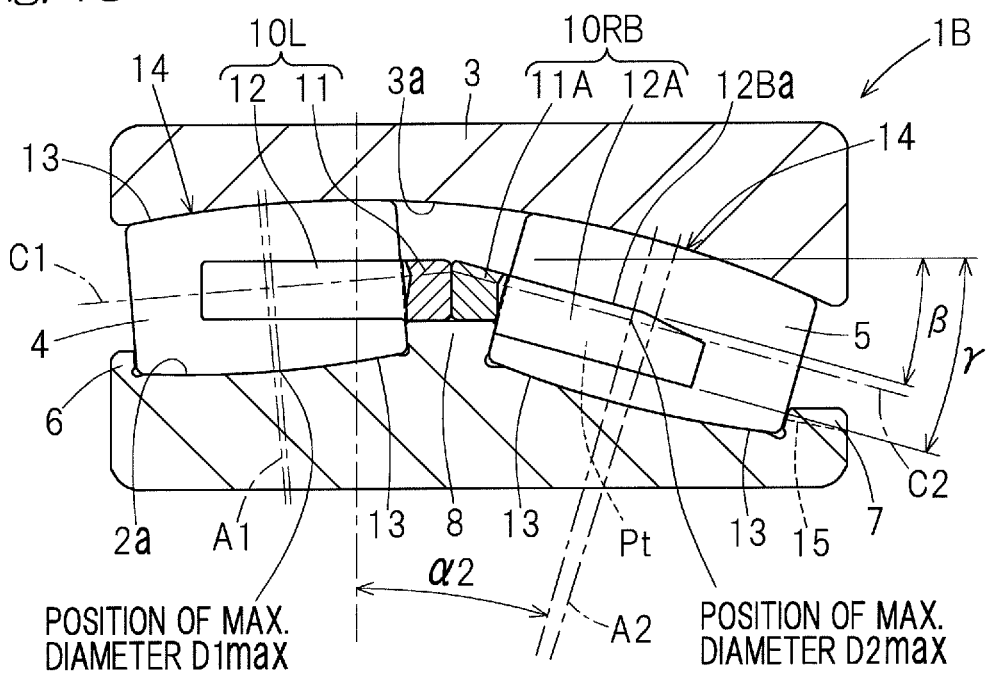
FIG. 18 is a longitudinal section view of a double-row self-aligning roller bearing according to a third embodiment of the present invention.

In a double-row self-aligning roller bearing 1B according to the third embodiment shown in FIG. 18, an inclination angle β of an outer diameter surface 12Ba of pillar portions 12B in one retainer 10RB is set to be within a range that is greater than zero and equal to or less than a maximum diameter angle α2 of rollers 5 in the right row, and an inclination angle γ of an inner diameter surface of the pillar portions 12B is set to be equal to the inclination angle θ of the outer diameter surface. The inclination angle β in this example is set to be an angle that is equal to or less than the maximum diameter angle α2 and substantially similar to the maximum diameter angle α2. Moreover, the inner diameter surface of the pillar portions 12B is composed only of an inclined surface portion and is not provided with a flat surface portion previously described. According to the configuration in FIG. 18, as the retainer 10RB has the inclination angle 3 as previously described, the pocket Pt surfaces of the retainer 10RB are more reliably maintained near a pitch circle diameter of the rollers 5, and the pocket Pt surfaces of the retainer 10RB can smoothly and reliably hold the maximum diameter position of the rollers 5 during bearing operation. Moreover, it is possible to more easily incorporate the longer rollers 5 into the bearing.

Although the present invention has been fully described in connection with the embodiments thereof with reference to the accompanying drawings, those skilled in the art will readily conceive numerous changes and modifications within the framework of obviousness upon the reading of the specification herein presented of the present invention. Accordingly, such changes and modifications are to be construed as included in the scope of the present invention as defined in the scope of the claims.

REFERENCE NUMERALS

1, 1A, 1B . . . Double-row self-aligning roller bearing
2 . . . Inner ring
3 . . . Outer ring
3a . . . Raceway surface
4, 5 . . . Roller
6, 7 . . . Small flange
8 . . . Intermediate flange
10L, 10R, 10RA, 10RB . . . Retainer
11, 11A . . . Annular portion
12, 12A, 12B . . . Pillar portions
13 . . . Crowning
14 . . . DLC coating
15 . . . Insertion groove
26 . . . Main shaft
A1, A2 . . . Center of the roller length
B . . . Bearing width
$D1_{max}$, $D2_{max}$ . . . Maximum diameter
L1, L2 . . . Length
P . . . Point where lines of action intersect
Q . . . Center position of the intermediate flange in the bearing width direction
S1, S2 . . . Lines of action
θ1, θ2 . . . Contact angle

What is claimed is:

1. A double-row self-aligning roller bearing comprising
an inner ring;
an outer ring having a spherical raceway surface;
rollers in two rows arranged in a bearing width direction interposed between the inner ring and the outer ring, the rollers in two rows each having an outer peripheral surface whose cross-sectional shape corresponds to the raceway surface of the outer ring; and
an intermediate flange provided between the two rows of the rollers on an outer peripheral surface of the inner ring and configured to guide the rollers in two rows,
wherein each roller in one row of the two rows has a length different from that of each roller in the other row of the two rows,
the length of the longer rollers is equal to or greater than 39% of a bearing width, and
a ratio of a contact angle θ1 of the shorter rollers relative to a contact angle θ2 of the longer rollers is within a range of 1:4 to 1:2,
wherein each of the rollers in two rows is an asymmetrical roller having a maximum diameter at a position displaced from a center of a roller length thereof to a center of the bearing relative to a bearing axial direction, and
wherein the intermediate flange has a center position in the bearing width direction displaced toward a side of the longer roller from a position of a point in the bearing width direction at which lines of action defining the contact angles of the respective rows intersect.

2. The double-row self-aligning roller bearing as claimed in claim 1, wherein the ratio of the contact angles is within a range of 1.0:3.5 to 1.0:2.5.

3. The double-row self-aligning roller bearing as claimed in claim 1, wherein the length of the longer rollers is equal to or less than 45% of the bearing width.

4. The double-row self-aligning roller bearing as claimed in claim 1, further comprising retainers configured to retain the rollers of the respective rows, wherein each retainer includes an annular portion configured to guide axially inner end faces of the rollers of each row; and a plurality of pillar portions extending in an axial direction from the annular portion and provided at predetermined intervals along a circumferential direction, the pillar portions defining therebetween pockets configured to retain the rollers, and wherein the pillar portions of one of the retainers which is configured to retain the longer rollers have an outer diameter surface inclined by an inclination angle inwardly in a radial direction from a proximal end side to a distal end side.

5. The double-row self-aligning roller bearing as claimed in claim 1, wherein each of the rollers has a rolling surface formed with a crowning on each end portion.

6. The double-row self-aligning roller bearing as claimed in claim 1, wherein each of the rollers has a rolling surface coated with a DLC coating.

7. The double-row self-aligning roller bearing as claimed in claim 1, wherein the inner ring includes end flanges provided on opposite ends of the outer peripheral surface, respectively, and facing axially outer end faces of the rollers of the respective rows, and one of the end flanges that faces the axially outer end faces of the longer rollers is provided with an insertion groove configured to, insert therethrough the longer rollers into the bearing.

8. The double-row self-aligning roller bearing as claimed in claim 1, wherein the bearing supports a main shaft of a wind turbine generator.

9. A double-row self-aligning roller bearing comprising
an inner ring;
an outer ring having a spherical raceway surface; and
rollers in two rows arranged in a bearing width direction interposed between the inner ring and the outer ring, the rollers in two rows each having an outer peripheral surface whose cross-sectional shape corresponds to the raceway surface of the outer ring,
wherein each roller in one row of the two rows has a length different from that of each roller in the other row of the two rows,
the longer rollers have a contact angle $\theta 2$ larger than a contact angle $\theta 1$ of the shorter rollers,
an intermediate flange is provided at a portion between the two rows of the rollers on an outer peripheral surface of the inner ring, and
the intermediate flange has a center position in the bearing width direction displaced toward a side of the longer rollers from a position of a point in the bearing width direction at which lines of action defining the contact angles of the respective rows intersect, and
wherein each of the rollers in two rows is an asymmetrical roller having a maximum diameter at a position displaced from a center of a roller length thereof to a center of the bearing relative to a bearing axial direction.

10. The double-row self-aligning roller bearing as claimed in claim 9, wherein a ratio of a contact angle $\theta 1$ of the shorter rollers relative to a contact angle $\theta 2$ of the longer rollers is within a range of 1:4 to 1:2.

11. The double-row self-aligning roller bearing as claimed in claim 10, wherein the ratio of the contact angles $\theta 1$, $\theta 2$ is within a range of 1.0:3.5 to 1.0:2.5.

12. The double-row self-aligning roller bearing as claimed in claim 9, wherein the contact angle $\theta 1$ of the shorter rollers is in a range of 5°-7°, the contact angle $\theta 2$ of the longer rollers is in a range of 14°-16°.

13. The double-row self-aligning roller bearing as claimed in claim 9, further comprising retainers configured to retain the rollers of the respective rows, wherein each retainer includes an annular portion configured to guide axially inner end faces of the rollers of each row; and a plurality of pillar portions extending in an axial direction from the annular portion and provided at predetermined intervals along a circumferential direction, the pillar portions defining therebetween pockets configured to retain the rollers, and wherein the pillar portions of one of the retainers which is configured to retain the longer rollers have an outer diameter surface inclined by an inclination angle inwardly in a radial direction from a proximal end side to a distal end side.

14. The double-row self-aligning roller bearing as claimed in claim 9, wherein each of the rollers has a rolling surface formed with a crowning on each end portion.

15. The double-row self-aligning roller bearing as claimed in claim 9, wherein each of the rollers has a rolling surface coated with a DLC coating.

16. The double-row self-aligning roller bearing as claimed in claim 9, wherein the inner ring includes the intermediate flange configured to guide the rollers in two rows; and end flanges provided on opposite ends of the outer peripheral surface, respectively, and facing axially outer end faces of the rollers of the respective rows, and one of the end flanges that faces the axially outer end faces of the longer rollers is provided with an insertion groove configured to insert therethrough the longer rollers into the bearing.

17. The double-row self-aligning roller bearing as claimed in claim 9, wherein the bearing supports a main shaft of a wind turbine generator.

* * * * *